United States Patent
Powers

(10) Patent No.: US 6,508,213 B2
(45) Date of Patent: Jan. 21, 2003

(54) VARIABLE SPEED DRIVE FOR AN AUXILIARY MEMBER IN AN INTERNAL COMBUSTION ENGINE

(75) Inventor: Michael V. Powers, Lakewood, NY (US)

(73) Assignee: Valeo Engine Cooling Inc., Rochester Hills, MI (US)

( * ) Notice: Subject to any disclaimer, the term of this patent is extended or adjusted under 35 U.S.C. 154(b) by 0 days.

(21) Appl. No.: 09/725,767

(22) Filed: Nov. 30, 2000

(65) Prior Publication Data

US 2002/0062809 A1 May 30, 2002

(51) Int. Cl.[7] ................................................. F01P 7/02
(52) U.S. Cl. ................................. 123/41.12; 123/198 R
(58) Field of Search .......................... 123/41.12, 198 R, 123/198 C, 41.44, 41.48, 41.49, 41.46

(56) References Cited

U.S. PATENT DOCUMENTS 2,045,870 A  *  6/1936  Paton ....................... 123/41.12
2,917,937 A  *  12/1959 Dodge ...................... 123/41.12
3,872,842 A  *  3/1975  Medley ..................... 123/41.11

FOREIGN PATENT DOCUMENTS

DE   2851938       *   6/1979
JP   62-233415     *   10/1987

* cited by examiner

Primary Examiner—Noah P. Kamen
(74) Attorney, Agent, or Firm—Liniak, Berenato & White

(57) ABSTRACT

A variable speed drive assembly for driving an auxiliary member in an internal combustion engine. The auxiliary member may be a fan connected to a pulley is driven by a drive pulley connected to a crankshaft of the internal combustion engine via a V-belt. At least one of the pulleys is an adjustable drive ratio pulley. An actuator is operatively connected to the drive assembly to controllable change the drive ratio of the pulley. By controlling the drive ratio of the pulley, the speed of the fan can be selectively controlled. The adjustable drive ratio pulley may have an inner idler freely rotatable mounted therein. The actuator may cause the V-belt to engage the inner idler to substantially disconnect a rotatable connection between the fan and the crankshaft thus allowing the fan to windmill.

14 Claims, 4 Drawing Sheets

VARIABLE SPEED DRIVE FOR AN AUXILIARY MEMBER IN AN INTERNAL COMBUSTION ENGINE

FIELD OF THE INVENTION

The present invention relates to a controllable drive system for an internal combustion engine and more particularly to a variable speed drive system for driving an auxiliary member such as a cooling fan.

DESCRIPTION OF THE PRIOR ART

Referring to FIG. 1 it is well known to employ a cooling fan for cooling engine coolant across a radiator. A pulley drive is directly connected to a rotatable spindle of a water pump which is driven by an engine crank shaft. The pulley drive is in turn connected to the fan pulley to rotate the fan and force airflow across a radiator. It is also known to include a clutch to selectively disengage the fan. One such fan drive is disclosed in U.S. Pat. No. 4,222,353 which is incorporated herein by reference.

In truck engine cooling applications, viscous drives are often employed to attempt variable speed drive of the cooling fan. However, these viscous type systems do not provide sufficient mechanical power, do not have full lock-up and full-off capabilities, require the fan to be aligned and within close proximity to the engine, and dissipate a tremendous amount of heat which wastes energy.

It is also known to employ a manually adjustable idler mechanism to adjust the tension on the belt across a pulley drive assembly. One such mechanism is disclosed in U.S. Pat. No. 4,500,303 and is incorporated herein by reference.

In the general transmission art, infinitely variably speed transmissions employing adjustable pulley drives are known within the prior art. A V-belt type stepless transmission, having an input pulley and an output pulley mounted on parallel input and output shafts, respectively, each of the input and output pulleys having a stationary flange and a movable flange axially displaceable relative to the stationary flange and rotatable integrally therewith; an endless V-belt lapped around the input and output pulleys to transmit power therebetween; and a spring and cam mechanism provided at least on one of the input and output shafts to vary compressive belt gripping force of the stationary and movable flanges in proportion to the torque transmitted by the belt. One such infinitely variable speed transmission is disclosed in U.S. Pat. No. 4,541,821 and is incorporated herein by reference. Lastly, speed sensitive variable ratio drive pulleys are known such as disclosed in U.S. Pat. No. 5,326,330 which is incorporated herein by reference.

SUMMARY OF THE INVENTION

It is an object of the invention to improve upon and overcome the drawbacks of the related art.

The present invention is directed to a variable speed drive assembly for an auxiliary member in an internal combustion engine. An auxiliary member, such as a fan, connected to a pulley is driven by a drive pulley connected to a crankshaft of the internal combustion engine via a V-belt. At least one of the pulleys is an adjustable drive ratio pulley. An actuator is operatively connected to the drive assembly to controllably change the drive ratio of the pulley. By controlling the drive ratio of the pulley, the speed of the fan can be selectively controlled. The adjustable drive ratio pulley may have an inner idler freely rotatable mounted therein. The actuator may also cause the V-belt to engage the inner idler to substantially disconnect a connection between the fan and the crankshaft thus allowing the fan to windmill. Thus the present invention contemplates selective variable speed control of a cooling fan for different engine operating conditions superior to devices found in the prior art.

DETAILED DESCRIPTION OF THE PREFERRED EMBODIMENT

Figure 1:
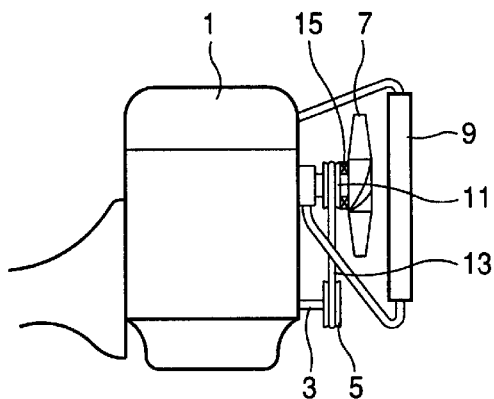
FIG. 1 is a schematic view of a conventional fan drive.

FIG. 1 depicts a conventional fan drive assembly (but may be another auxiliary member) for cooling a coolant in an internal combustion engine (ICE). An ICE 1 has a crankshaft portion 3 emerging from the block. A drive pulley 5 is connected to the crankshaft portion 3 for rotation therewith. A fan 7 is rotatably supported proximate a radiator 9 for forcing cooling air thereacross. A second driven pulley 11 is employed to drive the fan 7. As the crankshaft portion 3 rotates, the drive pulley 5 in turn drives the second pulley 11 and fan 7 via a V-belt 13. A clutch 15 may be employed to form a disconnect between the second pulley 13 and the fan 7.

However, it is desirous to selectively and variably control the speed of the fan 7 for different operating conditions. For example, while the ICE 1 and vehicle are stationery, it is desirable to rotate the fan 7 at a high speed. Conversely, when cruising along the highway, it is desirable to disconnect the fan 7 entirely. Furthermore, depending upon the ICE 1 temperature, amongst other operating conditions, it is desirable to variably control the speed of the fan 7 at intermediated speeds. The present invention provides the ability to selectively control an infinitely variable speed of the fan 7 between the highest speed and an idle speed in a simple and efficient manner.

Figure 2:
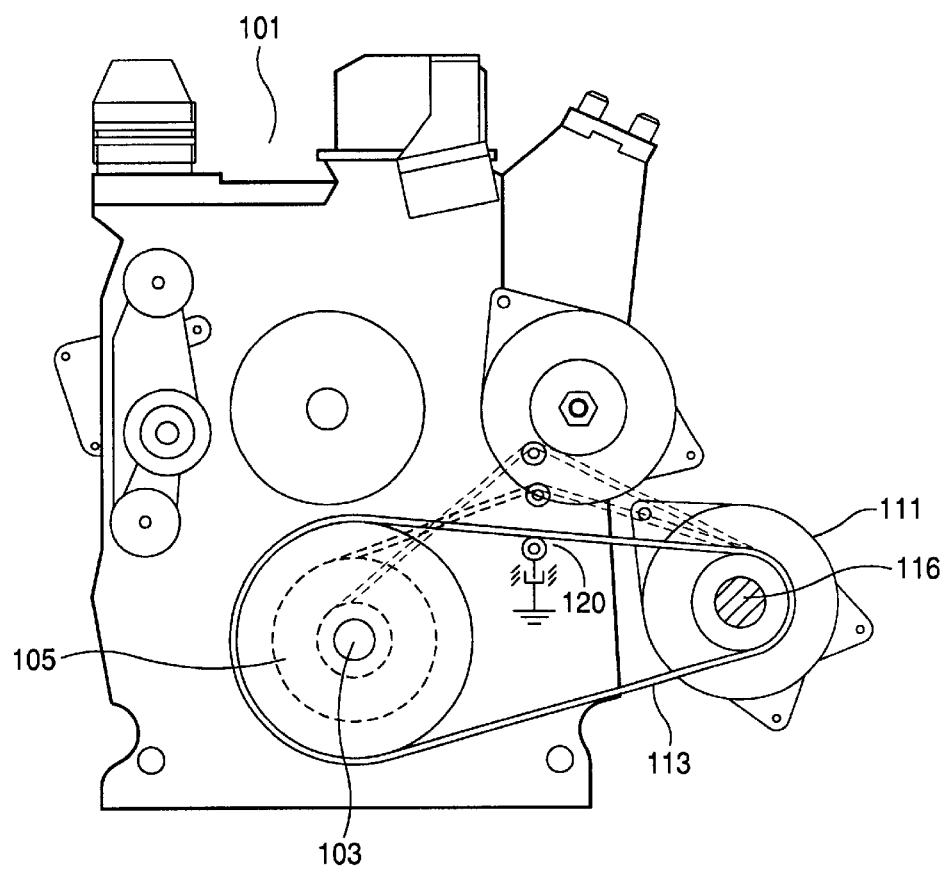
FIG. 2 is a front view of an internal combustion engine schematically depicting the variable pulley drive according to the present invention.

Referring now to FIG. 2, an ICE 101 has a crankshaft portion 103 drivingly connected to a first driving pulley 105. The first driving pulley 105 is a variable drive ratio pulley. A second driven pulley 111 drives a shaft 116 which is operatively connected to a fan (not shown). A V-belt 113 is disposed about the first 105 and second 111 pulleys to transmit power therebetween. Therefore, as the crankshaft portion 103 rotates, the fan 7 is ultimately driven. In order to control the speed of the fan 7 in relation to the crankshaft rotational speed, the first driving pulley 105 drive ratio is selectively changed. An actuator mechanism 120 is employed to change the drive ratio of the first pulley 105 and effectively change the speed of the fan.

The actuator 120 may be an adjustable idler mechanism. An independent adjustable height roller may be disposed between the first 105 and second 111 pulleys to engage the V-belt 113. The roller is selectively displaceable between an extended and retracted position. It is to be understood that the specific details of the adjustable idler mechanism 120 are not crucial to the operation of the present invention. The idler mechanism 120 simply needs to be fixed to a sturdy portion of the vehicle frame or directly to the ICE itself. A controllable hydraulic, electronic solenoid piston, screw drive or other linear actuation device may be employed to selectively displace the idler mechanism 120 within its range of motion. Preferably the actuator is electronically controlled. However, it is to be understood that one of ordinary skill in the art is readably capable of constructing a controllable adjustable idler mechanism 120. A spring/damper member is also preferably disposed between the actuator and the ICE block to absorb vibrations therebetween as schematically depicted in FIG. 2.

When high-speed fan drive is desired, the idler mechanism 120 is positioned in its fully retracted position to decrease the travel length of the V-belt 113 about the first 105 and second 111 pulleys. Consequently, the V-belt 113 is driven at a larger diameter and the effective drive ratio of the first drive ratio is at a maximum. As can be seen in FIG. 1, the fan 7 will be driven at a speed greater than the drive pulley 105. When low fan speed is desired, the idler mechanism 120 is fully extended and the travel length of the V-belt 113 between the pulleys increases to its maximum. Consequently, the flanges 121, 122 (See FIGS. 306) of the first drive pulley 105 are forced apart and the V-belt 113 engages the flanges 121,122 of the drive pulley 105 at a smaller radius and thus the fan 7 is driven at a slower speed than the crankshaft portion 3. Infinitely variable intermediate speeds are of course possible by simply selectively extending the idler mechanism 120 in an intermediate extended position.

Preferably, the actuator, or idler mechanism 120, is connected to the ICE control unit. The electronically, or even hydraulically controlled idler 120 may be selectively positioned according to various engine operating conditions. The system is calibrated to precisely control the speed of the fan 7, or other auxiliary device, in accordance with engine crank speed, vehicular speed, engine temperature, and other conditions. This calibration, and desired control of the speed is simply programmed into the ICE's electronic control unit (ECU). Selective speed control of the fan 7 is thus automatic according to predetermined criteria in relation to engine conditions. Of course, the system may be programmed to allow the operator manual control of the fan speed.

Figure 3:
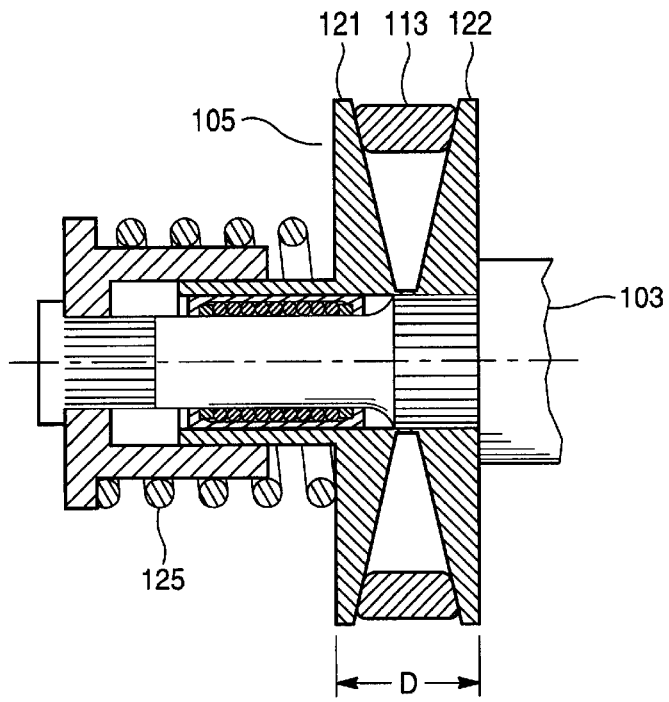
FIG. 3 is a partial sectional view of the variable pulley drive of FIG. 1 in a high-speed drive position according to one embodiment of the present invention.

Referring now to FIG. 3, the first drive pulley 105 is shown in the high-speed condition. When high fan speed is desired, the actuator 120 is retracted and the V-belt 113 engages the outermost portions of the flanges 121,122 of the pulley assembly. In order to facilitate a variable drive ratio, one flange 121 is moveable in relation to the opposite flange 122. A spring 125 may be simply employed to bias the drive pulley 105 in the high-speed position as shown in FIG. 3. As the length of travel of the V-belt 113 between the pulleys 105, 111 is increased, as by the actuator/idler mechanism 120, the increased travel length is accommodated by a decrease in travel length about the drive pulley 105. Consequently, the outer flanges 121,122 apart against the bias of the spring 125. Note the small distance between flanges as represented by D.

Figure 4:
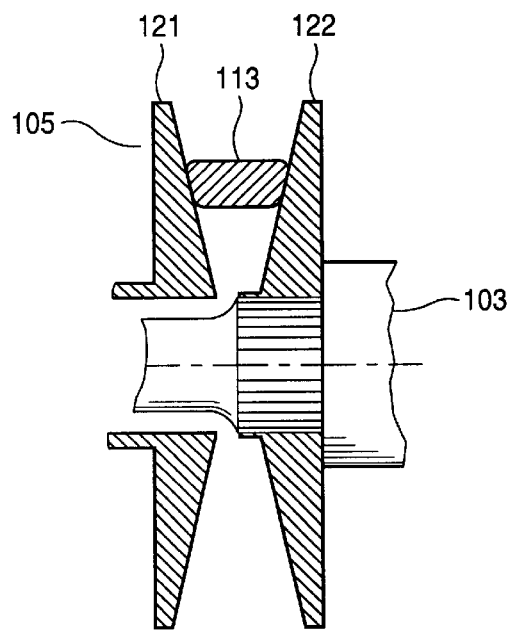
FIG. 4 is a partial cross sectional view of the variable pulley drive of FIG. 3 in an intermediate-speed drive position.
Figure 5:
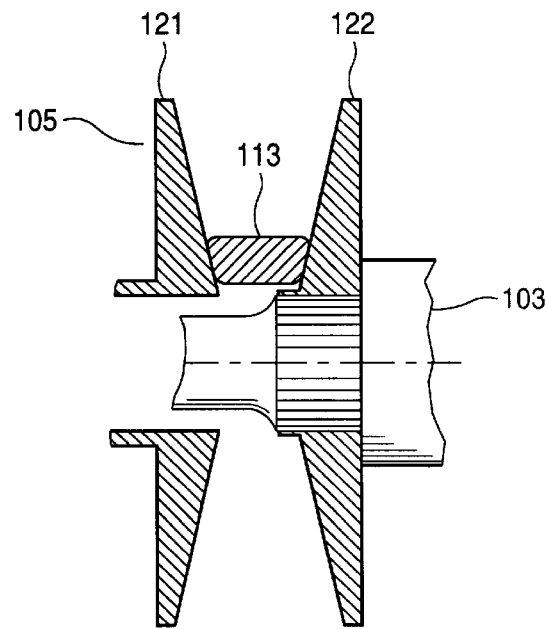
FIG. 5 is a partial cross sectional view of the variable pulley drive of FIGS. 3–4 in a low-speed drive position.

FIG. 4 represents the relative position of the V-belt 113 in an intermediate speed. The outer flange 121 is forced outward and the V-belt 113 moved radially inward. Thus the speed ratio between the drive pulley 105 and driven pulley 111 decreases. Lastly, FIG. 4 represents the position of the outer flange 121 in the slowest fan speed. In this position, the actuator/idler mechanism 120 in a fully extended position increases the travel between the pulleys 105, 111 to a maximum. Consequently, the outer flange 121 is forced to its outward most position and the V-belt 113 engages the drive pulley 105 at a radially innermost position. Thus the drive ratio between the drive 105 and driven pulleys 111 is at a minimum and the fan speed slowest in relation to the crankshaft portion 103.

It is to be understood, that the specific structure of the variably drive ratio pulley 105 of FIG. 3 is not critical to the operation of the present invention. So long as the flanges 121,122 cooperatively move in response to the desired speed ratio dictated by the actuator 120.

Figure 6:
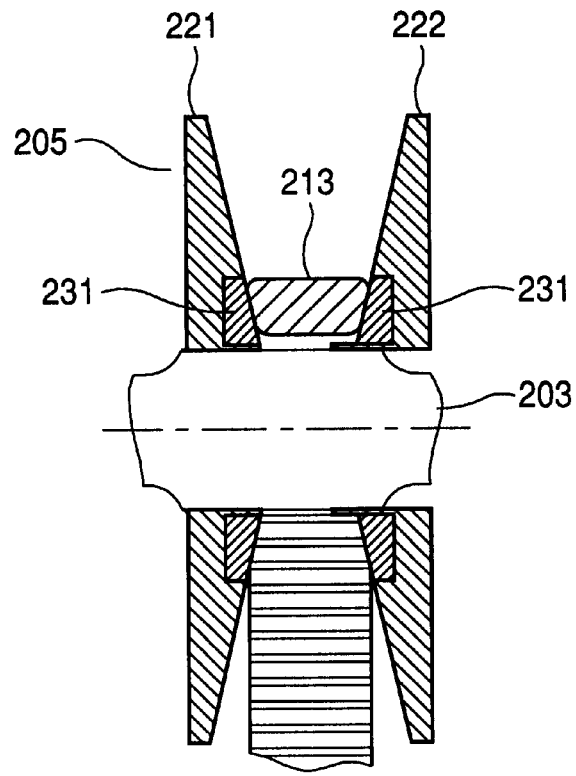
FIG. 6 is a partial cross sectional view of the variable pulley drive according to an alternate embodiment of the present invention.

FIG. 6 represents an alternate to the previous embodiment. It is sometimes desirable to disconnect the connection between the fan 7 and the crankshaft portion 3. In such an instance, the drive pulley 205 is equipped with an inner idler 231 freely rotatably mounted within the drive pulley 205 to allow free rotation therebetween. A bearing assembly (not shown) may be simply disposed between the inner idler 205 and the flanges 221,222 to facilitate relative rotation therebetween. Thus, when the actuator 120 is moved to the fully extended position, the V-belt 213 is forced radially inward and engages only the inner idler 231 apart from the rotating flanges 221,222. Thus the idler 231 is allowed to remain stationary as the flanges 221,222 and remaining portions of the drive pulley 105 are driven together with the crankshaft 3. Consequently, the fan 7, or other auxiliary device, is effectively disconnected from the driving effect of the crankshaft portion 3 and allowed to windmill.

The present invention has been shown and described in relation to variably controlling the drive ratio of the first driven pulley 105. However, the pulley of FIGS. 3–5 105 may equally be employed on the second drive pulley 111 driving the fan 7 or other auxiliary device. In which case the movements of the actuator/idler mechanism 120 in response to the aforementioned criteria simply need to be inverted.

Figure 7:
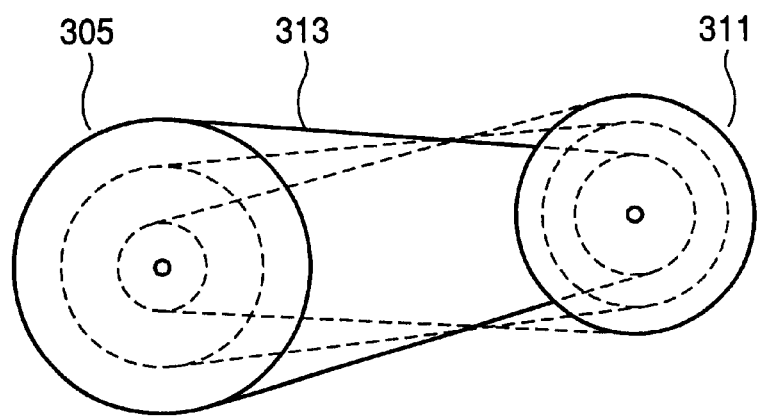
FIG. 7 is a schematic view of an alternate embodiment of the present invention.

FIG. 7 schematically represents an alternate embodiment of the present invention. In such an arrangement, two variably drive ratio pulleys 305, 311 are employed. The first driven pulley 305 may have an actuator directly attached thereto for directly controlling the drive ratio of the drive pulley 305 such as disclosed in U.S. Pat. No. 4,451,821. The second driven pulley 311, operatively connected to the fan 7 or other device, may simply be a spring/cam-biased pulley. This system acts much like a controllable infinitely variably speed transmission. The drive pulley 305 is simply controlled to vary the drive ratio. Higher drive ratios employed for high fan speeds and lower drive ratios for lower fan speeds. The controllable pulley 305 then need simply be connected to the ICE's ECU for control in response to the aforementioned criteria. In the instant embodiment, the effective length of travel of the V-belt 313 remains constant. As the first drive pulley 305 drive ratio increases, the second pulley 311 reacts by decreasing its drive ratio and the overall drive ratio between the first 305 and second 311 pulley's increases. Conversely, as the first pulley 305 drive ratio decreases, the second pulley's 311 drive ratio increases and the overall drive ratio between the two pulleys compoundingly decreases. The inner idler may similarly be employed to one of the pulleys of this embodiment.

Figure 8:
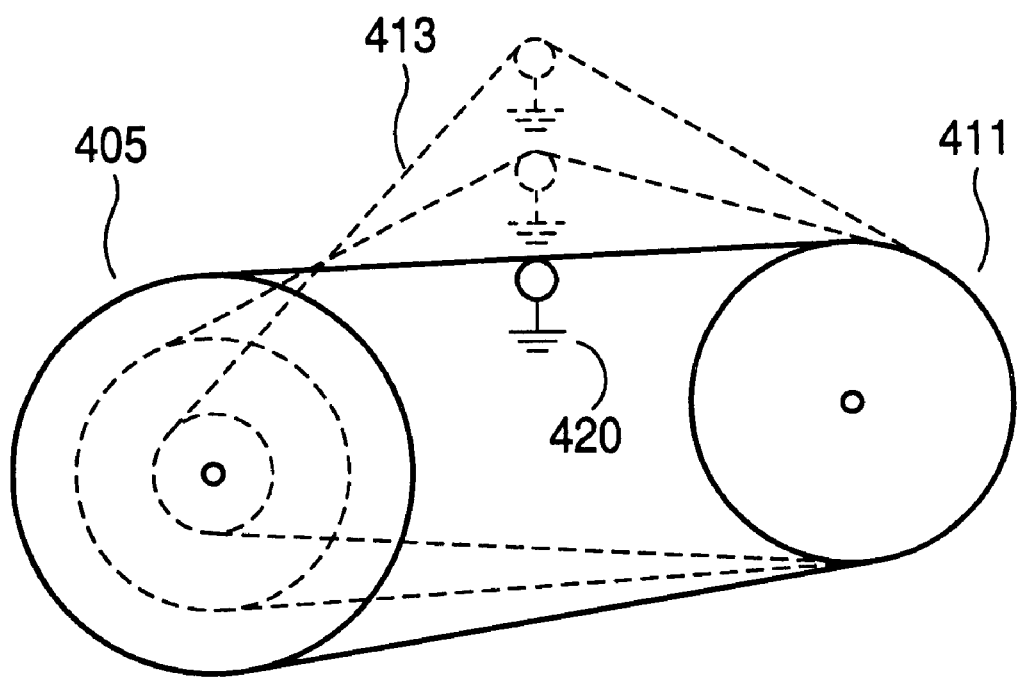
FIG. 8 is a schematic view of an additional alternate embodiment of the present invention.

FIG. 8 represents an alternate embodiment of the present invention. In this embodiment, one of the pulleys 411 is a fixed ratio pulley while the other pulley 405 is a controllable variable drive ratio pulley. A belt tensioner 420 is provided to engage the belt 413 to maintain tension between drive pulleys. While it is preferred to employ the controllable drive ratio pulley as the drive pulley connected to the engine crankshaft, it may also be connected to the driven auxiliary device or fan 7. Moreover, the belt tensioner 420 may be of any well known devices existing in the art.

One of the advantages to a variable speed control drive system is to allow a gradual speed increase when during high engine speeds. Activation of prior art prior art systems employing an on/off clutch causes the fan to jerk during high engine speeds. Moreover, the variable speed control may be used as an additional engine brake selectively draining power from the engine when desired.

While the foregoing invention has been shown and described with reference to a preferred embodiment, it will be understood by those possessing ordinary skill in the art that various changes and modifications may be made without departing from the spirit and scope of the invention. For example, while the present invention has been shown for use with a longitudinally aligned internal combustion engine, the present invention is equally suited for transversely mounted engine applications. Furthermore, while the preferred embodiment has been shown and described for use with a fan, the driven member is not limited to a fan and may be any auxiliary member within the engine compartment.

What is claimed is:

1. A drive assembly for driving an auxiliary member of an internal combustion engine, said assembly comprising:
   a first drive pulley connected to and driven by a rotatable member of said internal combustion engine;
   a second driven pulley connected to said auxiliary member;
   a belt disposed about said first and second pulleys to transmit power there between;
   wherein at least one of said first and second pulleys is an adjustable pulley having an adjustable drive ratio; and
   an actuator operatively connected to said drive assembly and controlling said drive ratio of said at least one of said first and second pulleys to selectively determine a desired rotational speed of said auxiliary member, wherein said actuator includes an adjustable idler mechanism disposed between said first and second pulleys and engaging said belt, said adjustable idler mechanism moveable within a displacement range to adjust a travel length of said belt between said first and second pulleys thereby changing said drive ratio of said at least one of said first and second pulleys.

2. The drive assembly according to claim 1, said at least one of said first and second pulleys further comprises an inner idler freely rotatably mounted therein, wherein when said idler mechanism is in a fully extended position, said belt is forced to engage said inner idler of said at least one of said first and second pulleys to substantially disconnect a connection between said auxiliary member and said rotatable element of said internal combustion engine.

3. The drive assembly according to claim 1, wherein said at least one of said first and second pulleys is said first drive pulley, said drive pulley being operatively connected to a crankshaft of said internal combustion engine.

4. The drive assembly according to claim 1, further comprising a spring damper member disposed between said idler mechanism and said internal combustion engine to absorb vibration there between.

5. The drive assembly according to claim 1, wherein said auxiliary member is a cooling fan for forcing air through a radiator.

6. A drive assembly for driving an auxiliary member of an internal combustion engine, said assembly comprising:
   a first drive pulley connected to and driven by a rotatable member of said internal combustion engine;
   a second driven pulley connected to said auxiliary member;
   a belt disposed about said first and second pulleys to transmit power there between;
   wherein at least one of said first and second pulleys is an adjustable pulley having an adjustable drive ratio; and
   an actuator operatively connected to said drive assembly and controlling said drive ratio of said at least one of said first and second pulleys to selectively determine a desired rotational speed of said auxiliary member
   wherein each of said first drive pulley and said second driven pulleys are a variable ratio pulley, said actuator being directly connected to one of said pulleys to control a drive ratio between said pulleys, said one of said pulleys being selectively controlled in response to a plurality of operating conditions of said internal combustion engine, said one of said pulleys including an inner idler freely rotatably mounted therein to substantially disconnect a rotatable connection between said auxiliary member and said rotatable element of said internal combustion engine.

7. A drive assembly for a cooling system of an internal combustion engine, said assembly comprising:
   a first drive pulley driven by a crankshaft of said internal combustion engine;
   a second driven pulley connected to a fan for forcing air through a radiator;
   a belt disposed about said first and second pulleys to transmit power therebetween;
   wherein said first drive pulley is an adjustable pulley having an adjustable drive ratio; and
   an adjustable idler mechanism disposed between said first and second pulleys and engaging said belt, said adjustable idler mechanism selectively moveable within a displacement range to adjust a travel length of said belt between said first and second pulleys thereby selectively controlling said drive ratio of said first drive pulley to selectively determine a desired fan speed, said first drive pulleys further having an inner idler freely rotatably mounted therein, wherein when said idler mechanism is in a fully extended position, said belt is forced to engage said inner idler of said first drive pulley to substantially disconnect a rotatable connection between said fan and said crankshaft of said internal combustion engine.

8. The drive assembly according to claim 7, further comprising a spring damper member disposed between said idler mechanism and said internal combustion engine to absorb vibration therebetween.

9. A combination internal combustion engine having a cooling system and a variable speed fan drive, said internal combustion engine having a rotatable crankshaft and said cooling system having a radiator for cooling a liquid coolant of said internal combustion engine, said variable speed fan drive comprising:
   a first drive pulley rotatably driven by said crankshaft of said internal combustion engine, said first drive pulley having an adjustable drive ratio;

a second driven pulley connected to said fan, said fan positioned proximate said radiator to force cooling air there through;

a belt disposed about said first and second pulleys to transmit power there between; and an actuator operatively connected to said variably speed fan drive assembly and controlling said drive ratio of said first drive pulley to selectively determine a desired fan speed; wherein said actuator includes an adjustable idler mechanism disposed between said first and second pulleys and engaging said belt, said adjustable idler mechanism moveable within a displacement range to adjust a travel length of said belt between said first and second pulleys thereby changing said drive ratio of said at least one of said first and second pulleys.

10. The drive assembly according to claim 9, said first drive pulley further comprises an inner idler freely rotatably mounted therein, wherein when said adjustable idler mechanism is in a fully extended position, said belt is forced to engage said inner idler of said first drive pulley to substantially disconnect a connection between said fan and said crankshaft.

11. The drive assembly according to claim 9, further comprising a spring damper member disposed between said adjustable idler mechanism and said internal combustion engine to absorb vibration therebetween.

12. A drive assembly for driving an auxiliary member of an internal combustion engine, said assembly comprising:

a first drive pulley connected to and driven by a rotatable member of said internal combustion engine;

a second driven pulley connected to said auxiliary member;

a belt disposed about said first and second pulleys to transmit power there between;

wherein at least one of said first and second pulleys is an adjustable pulley having an adjustable drive ratio; and an actuator operatively connected to said drive assembly and controlling said drive ratio of said at least one of said first and second pulleys to selectively determine a desired rotational speed of said auxiliary member, wherein one of said first drive pulley and said second driven pulley is a fixed drive ratio pulley, said assembly further comprising a belt tensioner disposed between said first and second pulleys and engaging said belt, said belt tensioner being moveable within a displacement range to displace said belt and maintain tension in said belt in response to a change in a drive ratio of said adjustable pulley.

13. The drive assembly according to claim 12, said one of said pulleys comprises an inner idler freely rotatably mounted therein to substantially disconnect a rotatable connection between said fan and said rotatable element of said internal combustion engine.

14. A drive assembly for driving an auxiliary member of an internal combustion engine, said assembly comprising:

a first drive pulley connected to and driven by a rotatable member of said internal combustion engine;

a second driven pulley connected to said auxiliary member;

a belt disposed about said first and second pulleys to transmit power there between;

wherein at least one of said first and second pulleys is an adjustable pulley having an adjustable drive ratio; and an actuator operatively connected to said drive assembly and controlling said drive ratio of said at least one of said first and second pulleys to selectively determine a desired rotational speed of said auxiliary member, wherein one of said first and second pulleys further comprises an inner idler freely rotatably mounted therein to substantially disconnect a rotatable connection between said auxiliary member and said rotatable element of said internal combustion engine when engaged by said belt.

* * * * *